(12) United States Patent
Hemauer

(10) Patent No.: US 6,422,639 B1
(45) Date of Patent: Jul. 23, 2002

(54) ELASTOMERIC WEB CAP

(75) Inventor: Stephan Hemauer, Achberg (DE)

(73) Assignee: Metzeler Automotive Profiles GmbH, Lindau/Bodensee (DE)

( * ) Notice: Subject to any disclaimer, the term of this patent is extended or adjusted under 35 U.S.C. 154(b) by 0 days.

(21) Appl. No.: 09/592,626

(22) Filed: Jun. 13, 2000

(30) Foreign Application Priority Data

Jun. 14, 1999 (DE) .......................... 199 26 955

(51) Int. Cl.⁷ ................................. B62D 25/04
(52) U.S. Cl. ...................... 296/146.5; 49/502
(58) Field of Search ................ 49/475.1, 502, 49/507; 296/146.5

(56) References Cited

U.S. PATENT DOCUMENTS 4,348,046 A * 9/1982 Ohya ................ 49/502 X

FOREIGN PATENT DOCUMENTS

| EP | 581389 | * | 2/1994 | ............ 296/146.5 |
| JP | 73726 | * | 6/1978 | ................ 49/502 |
| JP | 404303018 | * | 10/1992 | ............ 296/146.5 |
| JP | 405254345 | * | 10/1993 | ............ 296/146.5 |

* cited by examiner

*Primary Examiner*—Jerry Redman
(74) *Attorney, Agent, or Firm*—Stephen B. Salai, Esq.; Brian B. Shaw, Esq.; Harter, Secrest & Emery LLP

(57) ABSTRACT

An elastomeric web cap (15) for securing to a web (14) of a frameless door (10), more particularly a motor vehicle door (10). The web cap (15) is secured to the web (14) by at least one anchoring element (24; 31; 41) arranged in the middle of the web cap (15) to thus make for a reliable anchoring of the web cap (15) whilst achieving an enhanced overall visual appeal.

11 Claims, 3 Drawing Sheets

ELASTOMERIC WEB CAP

BACKGROUND OF THE INVENTION

The present invention relates to an elastomeric web cap for securing to a web of a frameless door, more particularly a motor vehicle door.

On frameless doors webs are known as a partition element disposed between two panes. A web cap located on the face side of the web serves to seal the door opening. Known web caps are secured to the web by bonding or mounting. The drawback in this arrangement is that no reliable securement of the web cap is attainable. In addition, the web cap overlaps the web and protrudes outwards, spoiling the visual appeal.

SUMMARY OF THE INVENTION

The object of the present invention is thus to provide a web cap which can be reliably secured to the web.

In accordance with the invention this object is achieved with a web cap of the aforementioned kind in that the web cap is secured to the web by at least one anchoring element arranged in the middle of the web cap.

This anchoring element permits reliable securement of the web cap to the web, any accidental removal or detachment in operation being reliably avoided. An overlap as required hitherto can now be eliminated thus making for a better overall visual appeal.

Advantageous aspects and further embodiments of the invention read from the sub-claims.

Advantageously, the anchoring element is concealed from the environment. Concealing it in this way may be done by the web cap and/or the web itself so that the anchoring element is not visible from without. This permits making use of anchoring elements which are unalike without spoiling the overall visual appeal.

In accordance with one advantageous further embodiment the anchoring element is secured to the web cap, thus reliably excluding any risk of the anchoring element being lost.

In a first advantageous aspect the web cap comprises a key engaging undercuts in the web. The key is molded to advantage together with the web cap to thus minimize complications in production.

In accordance with another advantageous further embodiment the web is provided with at least one substantially lobed cross-section appendage which is clasped by the web cap. The at least one lobed appendage prevents the web cap from being pulled off, thus achieving an improved fastening.

In accordance with a second advantageous aspect the web cap comprises an insert including a latching key for securing to the web. This latching key ensures a reliable securement of the web cap to the web even under heavy-duty conditions.

In yet another advantageous further embodiment the latching key comprises a flexible latching tongue for locating a recess in the web. To fit the web cap it is simply mounted on the web and shifted relative thereto until the latching tongue locates the recess, thus eliminating the need for any tool in speedy assembly.

Advantageously the insert is vulcanized in place in the web cap, resulting in a high-strength connection between the insert and the web cap. At the same time the insert is captively locked in place in the web cap to thus further simplify warehousing and assembly thereof In accordance with still another advantageous aspect use is made of lightning holes. Said lightning holes reduce the weight of the insert. In addition, locating the insert relative to the web cap is improved by the lightning holes.

In accordance with a third advantageous aspect the web cap is covered by a cap which is secured to the web by means of an anchoring element. The web cap is thus reliably held by the cap over the majority of its outer surface or by the entirety thereof.

Advantageously the anchoring element penetrates the web cap, the web cap then being held not only at its outer surface by the cap but simultaneously at its inner surface by the anchoring element to thus improve the securement.

In still a further advantageous embodiment the cap is made of metal, more particularly of aluminum. Making use of a metal for the cap permits adapting it to the color scheme of the web without variations to the web cap. Furthermore, by adapting it to the color scheme of the web a substantially enhanced overall visual appeal is achieved.

In accordance with still another advantageous aspect the anchoring element is secured to a middle portion of the web, this middle portion existing in known webs and serving to stiffen the arrangement, i.e. eliminating the need for any additional component or major alterations to known webs.

Advantageously the web cap is flush-fitted at the outer and/or inner surface of the door with the web, thus achieving a smooth outer and/or inner surface which substantially enhances the visual appeal.

BRIEF DESCRIPTION OF THE DRAWINGS

The invention will now be detailed by way of example embodiments as shown schematically in the drawing in which.

DETAILED DESCRIPTION OF THE PREFERRED EMBODIMENT

Figure 1:
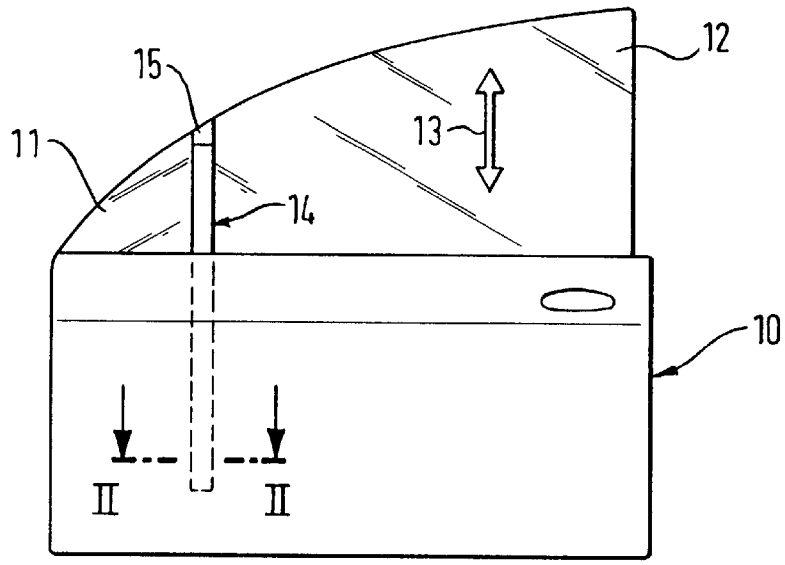
FIG. 1 is a schematic side view of a door.

Referring now to FIG. 1 there is illustrated a schematic side view of a frameless door 10. Provided in the door 10 are two panes 11, 12. Pane 12 is movable in the direction of the arrow 13. Disposed between the panes 11, 12 is a web 14. The web 14 serves to mount and guide the panes 11, 12. At its upper side the web 14 is provided with a web cap 15. The web cap 15 serves to seal the web relative to the door opening (not shown).

Figure 2:
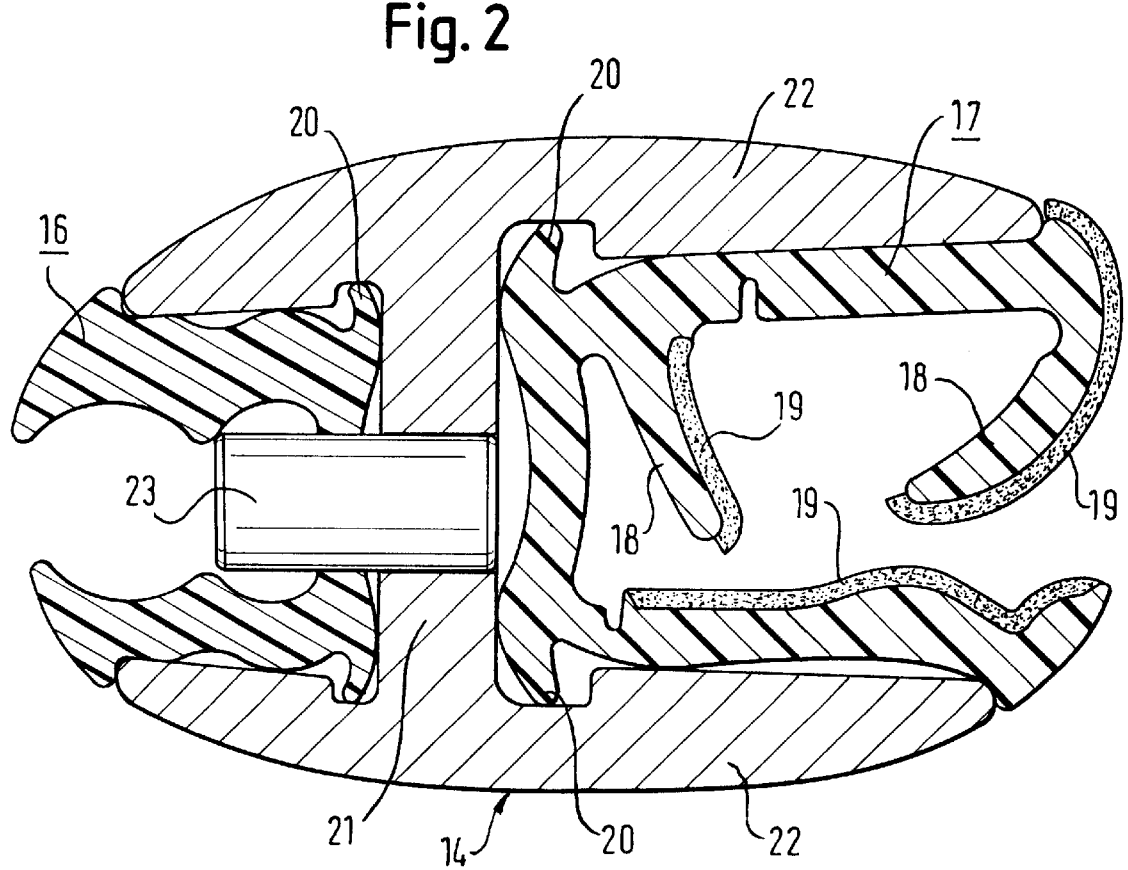
FIG. 2 is a section taken along the line II—II in FIG. 1 shown magnified.

Referring now to FIG. 2 there is illustrated a cross-section through the web 14 below the guide portion for the pane 1. The web 14 comprises two opposite side portions 22 connected via a middle portion 21, resulting in an approximately H-shaped cross-section. Secured to the web 14 are two profiles 16, 17. The profile 16 is prevented from moving on the web 14 by lips 20 and a pin 23. This profile 16 serves to guide the pane 11. Arranged at the opposite side is the profile 17 for guiding the pane 12. This profile 17 is likewise secured via lips 20. Sealing lips 18 serve to seal the pane 12.

Provided further is a friction-reducing coating 19 to enhance the ease of movement of the pane 12 and to subdue squeaking.

Both profiles 16, 17 protrude somewhat beyond the web 14 and are therefore visible from the outside. The web cap 15 is joined to the profiles 16, 17, for example by being heated, to thus achieve a smooth transition between the profiles 16, 17 and the web cap 15.

Figure 3:
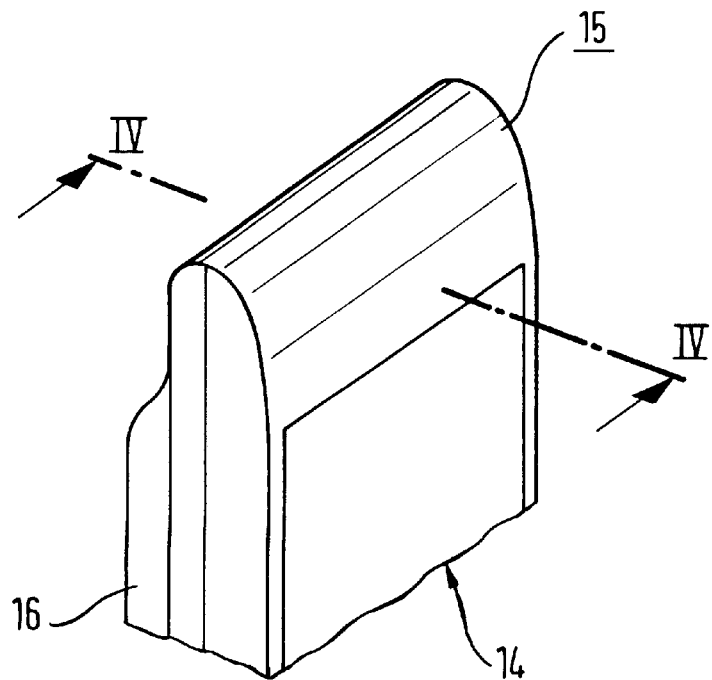
FIG. 3 is a view in perspective of a first embodiment of the web cap in accordance with the invention;.
Figure 4:
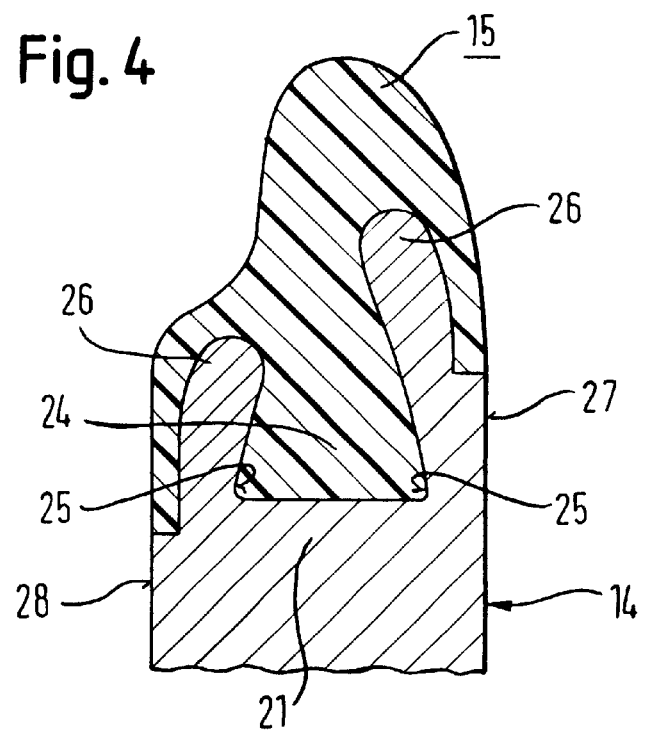
FIG. 4 is a section taken along the line IV—IV in FIG. 3.

Referring now to FIGS. 3 and 4 there is illustrated a first embodiment of the web cap 15 in accordance with the invention. This elastomeric web cap comprises a key 24. This key 24 is flared towards the web 14 and engages undercuts 25 in the web, as a result of which the web cap 15 is reliably prevented from becoming detached from the web 14.

To further enhance this captive lock the web 14 is provided with two appendages 26 substantially lobed in cross-section which are clasped by the web cap 15. Due to this substantially lobed cross-section the appendages 26 counteract any tendency of the web cap 15 to become detached.

The web cap 15 is a flush fit with both the outer surface 27 and the inner surface 18 of the web 14 to thus provide a smooth surface throughout which substantially enhances the overall visual appeal.

Figure 5:
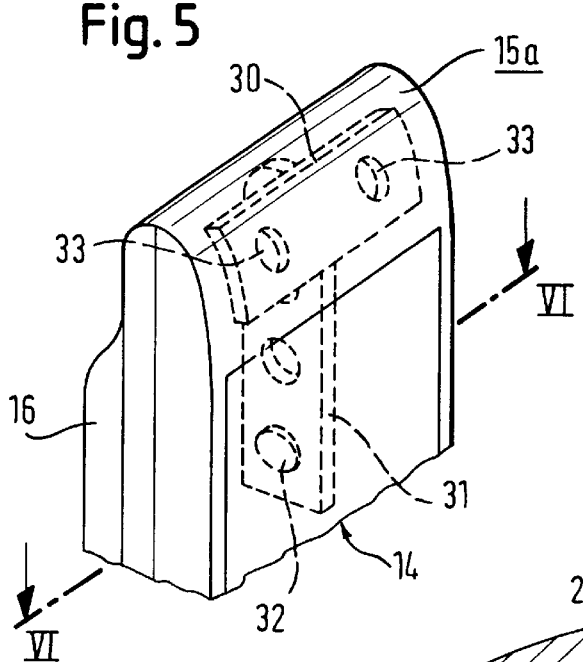
FIG. 5 is a view in perspective of a second embodiment of the web cap in accordance with the invention.
Figure 6:
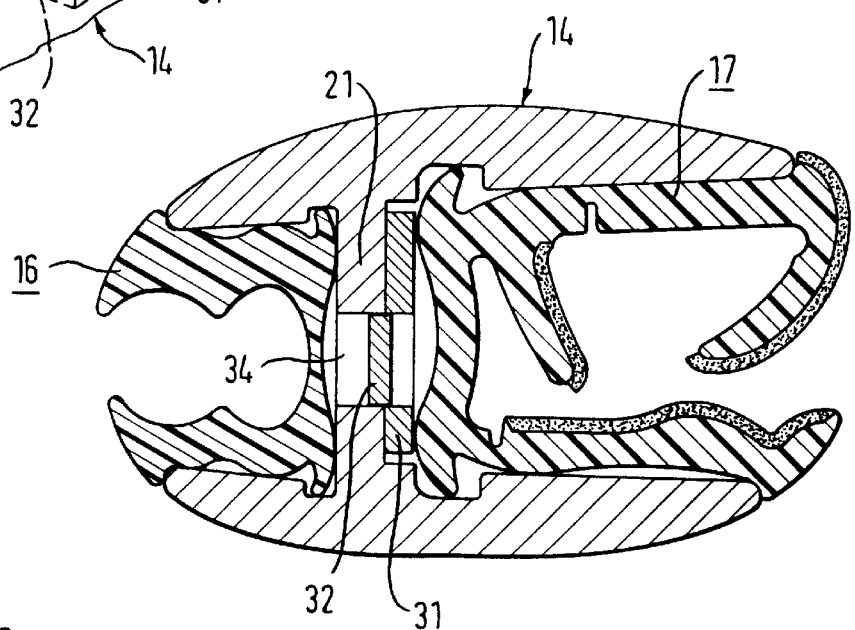
FIG. 6 is a section taken along the line VI—VI in FIG. 5.

Referring now to FIGS. 5 and 6 there is illustrated yet another embodiment of a web cap 15a in accordance with the invention in a view as shown in FIG. 3. Vulcanized in place in the web cap 15a is an insert 30. This insert 30 comprises a latching key 31 for securing to the web 14. The insert 30 is provided with openings 33 which improve the joint between the insert 30 and the web cap 15a.

Referring now to FIG. 6 there is illustrated how for securement a flexible latching tongue 32 is arranged on the key 31, this latching tongue 32 engaging a recess 34 in the web cap 15 in the fitted condition of the web cap 15a. For fitting, the web cap 15a is mounted on the web 14 and then urged downwards, causing the latching tongue 32 to automatically locate the recess 34. No additional tool is required for this, the web cap 15a being reliably secured to the web 14 after latching in place.

It is to be noted that in the embodiments as shown in FIGS. 1 to 6 the anchoring element 24, 31 is secured to the web cap 15.

Figure 7:
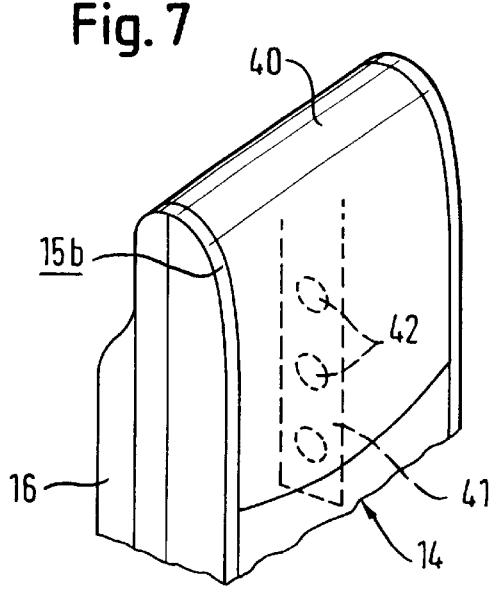
FIG. 7 is a view in perspective of a third embodiment of the web cap in accordance with the invention.

Referring now to FIG. 7 there is illustrated a third embodiment of a web cap 15b in accordance with the invention. The web cap 15b is covered by a cap 40, i.e. is visible only at its edge portion. The cap 40 directly connects the web 14 and is made of aluminum, thus enabling the color scheme of the cap 40 to be adapted to that of the web so as to produce a uniform surface finish to the observer.

For securing the web cap 15b the cap 40 comprises an anchoring element 41 penetrating the web cap 15b. The anchoring element 41 is provided with lightning holes 42 illustrated schematically. Said lightning holes 42 reduce the weight of the anchoring element 41. For securing to the web 14 a key may be made use of as shown in FIG. 5. As an alternative the anchoring element 41 may be screwed to the side portions 22 of the web 14.

It is to be noted that in all embodiments of the web cap 15 in accordance with the invention the anchoring elements are concealed from the environment and not visible on the outside. The outer surface of the web cap 15 may be configured irrespective of the anchoring elements and adapted to the web 14 to thus make for a reliable anchoring of the web cap 15 whilst achieving an enhanced overall visual appeal.

What is claimed is:

1. An elastomeric web cap for sealing a web disposed between two panes of a frameless motor vehicle door, relative to a door opening, the web including an inner visible surface and an outer visible surface, the web cap comprising at least one anchoring element arranged in the middle of the web cap and concealed from the environment for securing the web cap to the web and the web having at least one appendage substantially lobed in cross-section which is clasped by said web cap, and the web cap having at least one surface for flush fitting with one of the inner and outer visible surfaces.

2. The web cap as set forth in claim 1, in which said anchoring element is secured to said web cap.

3. The web cap as set forth in claim 1 in which said web cap comprises a key engaging undercuts in said web.

4. The web cap as set forth in claim 1 in which said anchoring element penetrates said web cap.

5. The web cap as set forth in claim 1, in which said web cap is made of metal.

6. The web cap as set forth in claim 5 in which said metal is aluminum.

7. The web cap as set forth in claim 1 in which said anchoring element is secured to a middle portion of said web.

8. An elastomeric web cap for scaling a web disposed between two panes of a frameless motor vehicle door, relative to a door opening, the web including an inner visible surface and an outer visible surface and the web cap comprising:
    at least one anchoring element arranged in the middle of the web cap for securing the web cap to the web including a key engaging undercuts in the web and
    the web is provided with at least one appendage substantially lobed in cross-section which is clasped by said web cap.

9. A web cap for securing to a web of a frameless door the web cap comprising an insert having a plurality of openings and including a flexible latching tongue for locating a recess in the web for securing the web cap to the web.

10. The web cap as set forth in claim 9 in which said insert is vulcanized in place in said web cap.

11. A web for sealing between two panes of a frameless motor vehicle door comprising at least one appendage substantially lobed in cross-section and a web cap clasping said web, and the web cap comprising a key engaging undercuts in the web.

* * * * *

UNITED STATES PATENT AND TRADEMARK OFFICE
CERTIFICATE OF CORRECTION

PATENT NO. : 6,422,639 B1
DATED : July 23, 2002
INVENTOR(S) : Stephen Hemauer

It is certified that error appears in the above-identified patent and that said Letters Patent is hereby corrected as shown below:

<u>Title page,</u>
Item [30], Foreign Application Priority Data, the correct serial number should read -- 199 26 955.6 --

Signed and Sealed this

Twenty-eighth Day of January, 2003

JAMES E. ROGAN
*Director of the United States Patent and Trademark Office*